Feb. 21, 1950   A. SVOBODA   2,498,308
MECHANICAL COMPUTER
Filed April 1, 1946   2 Sheets-Sheet 1

INVENTOR
ANTONIN SVOBODA
BY
ATTORNEY

INVENTOR
ANTONIN SVOBODA

Patented Feb. 21, 1950

2,498,308

UNITED STATES PATENT OFFICE 2,498,308

MECHANICAL COMPUTER

Antonin Svoboda, Cambridge, Mass.

Application April 1, 1946, Serial No. 658,596

2 Claims. (Cl. 235—61)

This invention relates to a mechanical computer and more particularly to a mechanical computer which solves directly for an empirical function of two independent variables. In the use of computers for anti-aircraft gun-laying, it is necessary to compute the average shell speed from the gun to the target. For ranges under approximately 5000 yards, this quantity is a function of the initial shell speed, the air density and the range. However, in order to assure accuracy for ranges greater than 5000 yards, it is necessary to correct this value by a quantity which may be understood in a general manner from the following explanation. As the gun elevation angle increases, the average shell speed has a tendency to decrease because of the greater component of gravity acting along its path, and a tendency to increase because of the low density of the air at higher altitude. There results a correction in shell speed which is an empirical function of gun elevation and also of the range.

For general information purposes in connection with the present invention, reference is made to the textbook, Computing Mechanisms and Linkages, vol. 27, by Antonin Svoboda, Massachusetts Institute of Technology, Radiation Laboratory Series, first edition 1948, McGraw-Hill Book Company, Inc.

An object of this invention is to provide a mechanical computer which solves directly for an empirical function of two independent variables.

Another object of this invention is to provide a mechanical computer for determining a correction for average shell speed where such correction is an empirical function of two independent variables.

A still further object of this invention is to provide a mechanical computer for determining a correction for average shell speed where such correction is an empirical function of the range of the target and elevation of the gun.

Still another object of this invention is to provide a computer for determining the variation of the speed of a shell at any point along its path of travel, from the average speed of the shell.

Other objects and advantages of this invention as well as its arrangement, construction and operation will be apparent from the following description and claims in connection with the accompanying drawings, in which:

If the average shell speed be referred to as V, then the heretofore described correction to the average shell speed $\Delta V$, which is an empirical function of range and elevation is defined as $\Delta V = f(R, E)$, where R and E indicate the range of and elevation of the gun. The purpose of the invention is to compute the quantity defined by the expression $\Delta V = f(R, E)$ if the quantities R and E are available as shaft rotations.

Figure 1:
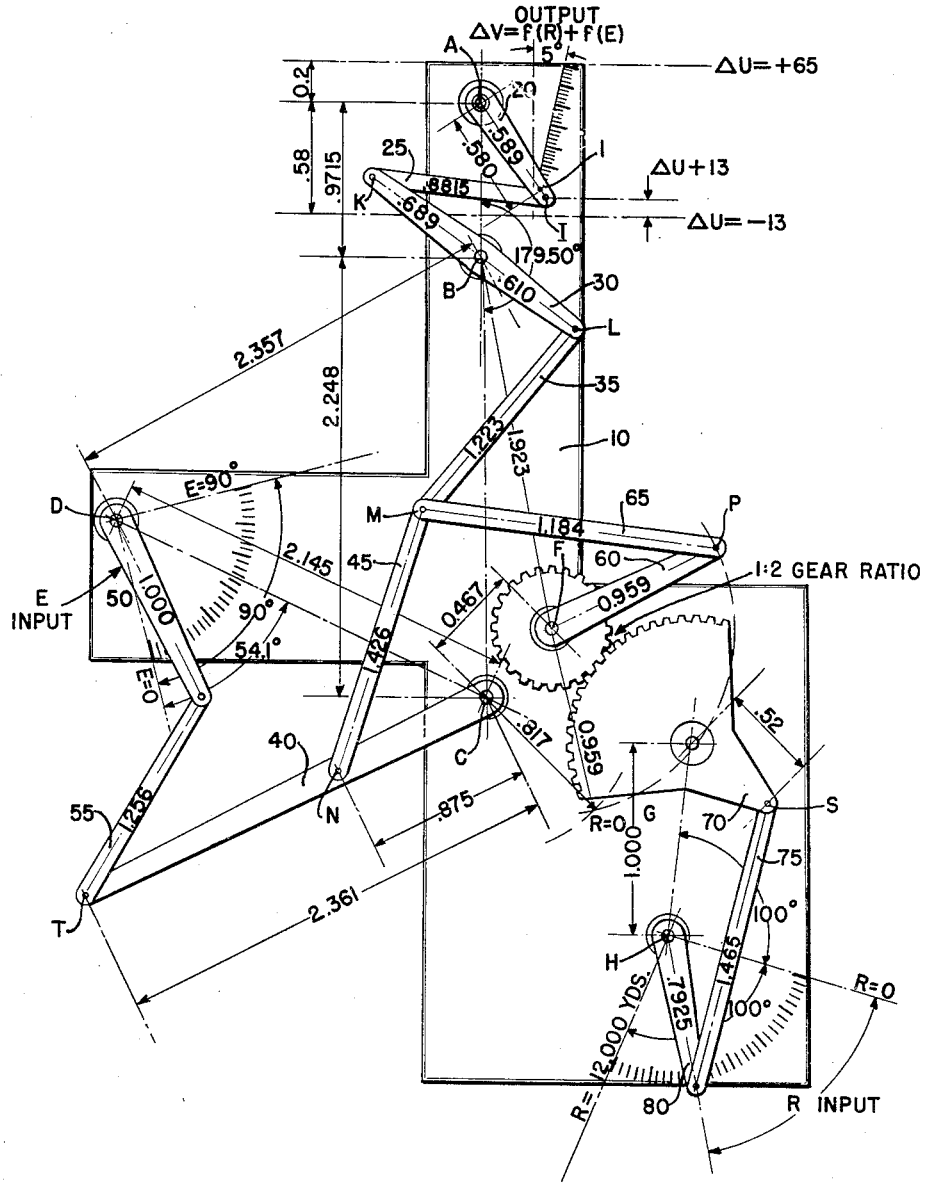
Fig. 1 is an assembly drawing of a computer constructed in accordance with the principles of this invention.

Referring to Fig. 1, there is shown a general arrangement of a mechanism for computing the above quantity having seven pivoted or swinging members 20, 30, 40, 50, 60, 70 and 80, pivoted to a fixed support 10 at the pivot points A, B, C, D, F, G, and H, respectively. A link 25 connects the free end of member 20 with one end of member 30 at point K as shown. A pair of links 35 and 45 which are pivotally connected at point M operatively connect members 30 and 40 at points L and N respectively. A link 55 operatively connects member 50 and, the free end of member 40, at point T as shown. The free end of member 60 is operatively connected to junction point M of links 35 and 45 by a link 65. A final link 75 operatively connects the free end of member 80 to a point S of member 70. Members 60 and 70 are operatively connected by means of a gear drive so that rotation about pivot point G is used to produce rotation about pivot point F in the ratio of two-to-one. It is to be understood that all of the connections referred to are pivot connections so as to allow relative movements of the connected members, unless it is expressly indicated that the connections are rigid in character.

In the operation of the device, it is assumed that values of the range and gun elevation are available as shaft rotations (from shafts not shown) so that arms 50 and 80 may be set to any desirable value of such range and gun elevation within the limits of operation of the mechanism. As indicated in Fig. 1, arm 50 may be rotated through an angle of 90°, such rotation corresponding to values of gun elevation from 0 to 90°. Similarly, arm 80 may be rotated through an angle of 100°, such rotation corresponding to values of range from zero to 12,000 yards. The scales, indicating the setting of arms 50 and 80 between the limits of operation thereof, are linear for both the elevation and range. In other words, the elevation input scale including an arc of 90° is uniformly calibrated to correspond to a range of given elevation from 0° to 90° from a horizontal position; and the range input scale including an arc of 100° is uniformly calibrated to correspond to a range of target ranges from 0 to 12,000 yds. Each degree of angular displacement of member 80 therefore represents a change of range of 120 yds. The output of the system, which is the correction to shell speed for the range and elevation settings given to arms 80 and 50 respectively, is linear, the component of the displacement of point I of arms 20 representing the output of the device being along a line tilted five degrees (5°) from the line joining pivot points A and B. Thus, when the output is at its minimum value, that is, when the point I lies on the line connecting pivots A and B the output will subtract 13 yards per second from the average shell speed. At the maximum output value, the output will add 65 yards per second to the average shell speed. The output range is thus from —13 to +65 yards per second, the scale being linear. In this manner as shown, the displacement of point I from its minimum position is proportional to ΔV+13. As indicated on the figure, the position of point I for the maximum output value is .2 unit beyond pivot point A.

Figure 2:
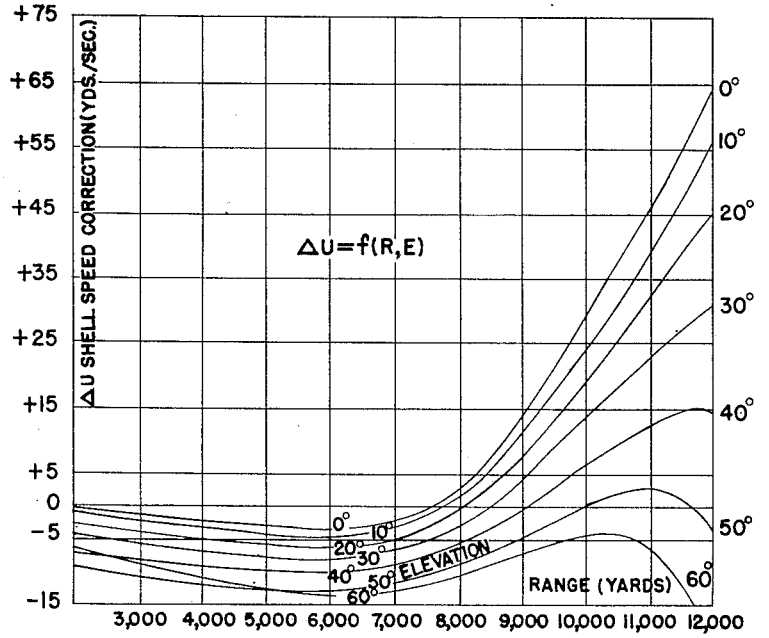
Fig. 2 is a graph indicating the theoretical shell speed correction as a function of range and elevation.

In order that the component of the displacement of point I of arm 20 along a line tilted five degrees from a line joining pivots A and B be proportional to the computed variation of shell speed from the average shell speed for given settings of elevation and range as shown in Fig. 2, the relative dimensions, when the basis of measurement is taken as unity (1), of the various members of the mechanism must be as follows:

| | |
|---|---|
| Distance from pivot point A to pivot point B | .9715 |
| Distance from pivot point B to pivot point C | 2.248 |
| Angle included between lines connecting pivot points A and B and B and C ____ degrees | 179.50 |
| Distance from pivot point B to pivot point D | 2.357 |
| Distance from pivot point C to pivot point D | 2.145 |
| Distance from pivot point B to pivot point F | 1.923 |
| Distance from pivot point C to pivot point F | .467 |
| Distance from pivot point G to pivot point H | 1.000 |
| Length of arm 20 | .589 |
| Length of link 25 | .8815 |
| Length of member 30 from point B to point K | .689 |
| Length of member 30 from point B to point L | .610 |
| Length of link 35 | 1.223 |
| Length of link 45 | 1.426 |
| Length of member 50 | 1.000 |
| Length of member 40 | 2.361 |
| Distance from point of connection of member 45 to member 40, to pivot point C | .875 |
| Length of link 55 | 1.256 |
| Length of member 60 | .959 |
| Length of link 65 | 1.184 |
| Length of member 70 from pivot point G to point S thereon | .520 |
| Length of link 75 | 1.465 |
| Length of member 80 | .7925 |

Figure 3:
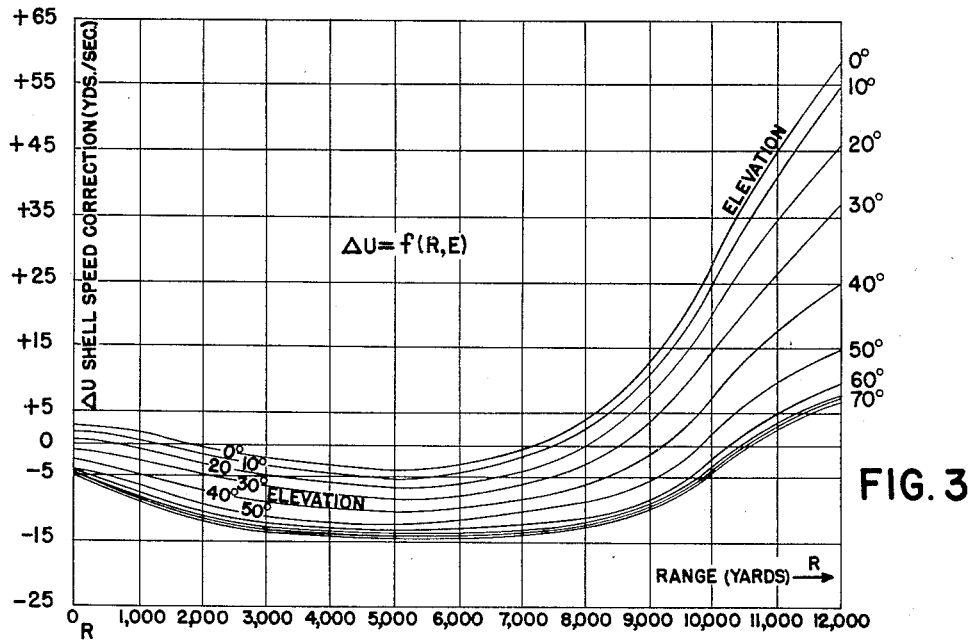
Fig. 3 is a graph of the output of the present device indicating the shell speed correction plotted against range and elevation input values.

As heretofore stated, rotation about pivot G is used to produce rotation about pivot F, this rotation being transferred by means of a two-to-one gear drive. The actual position of pivot G with respect to pivot F is not important, but the gears must match so that when the range and elevation input are positioned at some given pair of values, the ΔV output is set at the corresponding value shown in Fig. 3. Pivot point H lies at a distance one unit from pivot point G. The actual location of point H, so long as it is one unit away from pivot point H is immaterial, provided the gear ratio of 1 to 2 is maintained and so long as the setting of point P is proper when the range setting is zero. The proper setting for point P when R equals zero is at the point of intersection of two lines of .817 and .959 relative lengths drawn from points C and F respectively. It is to be understood that while critical dimensions of the various members of the linkage mechanism have been stated, these dimensions may vary by as much as 2% (.02) without impairing the operation of the device. While a particular embodiment of my invention has been disclosed and described, it is to be understood that various modifications and changes may be made in this invention without departing from the spirit and scope thereof as set forth in the appended claims.

What is claimed is:

1. A mechanical computer for determining variation of the speed of a shell at any point along the path of travel thereof from the average shell speed, said computer comprising, a support, a first swinging member pivotally attached to said support, said first swinging member being adapted to swing through an arc of 90° for introducing gun elevation settings into the computer, a second swinging member pivotally attached to said support and adapted to swing through a uniformly graduated arc for introducing range settings into the computer, a third swinging member pivotally attached to said support, a uniformly calibrated scale on said support in juxtaposition with said third swinging member for indicating variation of shell speed from the average shell speed, fourth, fifth, sixth and seventh swinging members pivotally attached to said support, said aforementioned swinging members being positioned in substantially coplanar relation with each other, a first link operatively connecting said third and fourth swinging members, second and third links operatively connecting said fourth and sixth swinging members, a fourth link operatively connecting the junction point of said second and third links and said fifth swinging member, a pair of gears operatively connecting said fifth and seventh swinging members, said gears being of such a ratio that the displacement of said fifth swinging member is twice the displacement of said seventh swinging member, a fifth link connecting said second and seventh swinging members, and a sixth link connecting said first and sixth swinging members, said links and said swinging members having the following relative dimensions and orientation where the basis of measurement is taken as unity (1)

| | |
|---|---|
| Length of said first swinging member | 1.000 |
| Length of said second swinging member | .7925 |
| Length of said third swinging member | .589 |
| Length of said fourth swinging member from the pivot point thereof to the point of connection thereto of said first link | .689 |
| Length of said fourth swinging member from the pivot point thereof to the point of connection thereto of said second link | .610 |
| Length of said fifth swinging member | .959 |
| Length of said sixth swinging member | 2.361 |
| Length of said seventh swinging member | .520 |
| Length of said first link | .8815 |
| Length of said second link | 1.223 |
| Length of said third link | 1.426 |
| Length of said fourth link | 1.184 |
| Length of said fifth link | 1.465 |
| Length of said sixth link | 1.256 |
| Distance of the pivot point of said third swinging member from the pivot point of said fourth swinging member | .9715 directly above |
| Distance of the pivot point of said sixth swinging member from the pivot point of said fourth swinging member | 2.248 substantially directly below |
| Radial distance of the pivot point of said first swinging member from the point of said fourth swinging member | 2.357 downward to left |
| Radial distance of the pivot point of said first swinging member from the pivot point of said sixth swinging member | 2.145 upward to left |
| Angle between the zero position of said first swinging member and a line joining the pivot points of said first and sixth swinging member | 54.1° |
| Length of said sixth swinging member from the pivot point thereof to the point of connection thereto of said third link | .875 |
| Radial distance of the pivot point of said fifth swinging member from the pivot point of said fourth swinging member | 1.923 downward to right |
| Radial distance between the pivot points of said fifth and sixth swinging members | .467 |
| Radial distance between the pivot points of said second and seventh swinging members | 1.000 | the aforementioned dimensions and orientation of said members and links providing that the component of displacement of said third swinging member across said scale is a function of the variation of the shell speed from the average shell speed as determined by the settings of said first and second swinging members.

2. A mechanical computer for determining the variation of the speed ($\Delta V$ of a shell along the path of travel thereof from the average shell speed, which variation is dependent upon the independent variables of elevation (E) and range (R) in accordance with an empirical function defined by the expression $\Delta V = f(R, E)$, said computer comprising, a planar support having a longitudinal and a transverse axis, a first swinging member pivotally attached to said support adapted to be rotated by a shaft for introducing gun elevation (E) settings into the computer, said first swinging member being adapted to swing through an arc of 90°, a first scale positioned on said support cooperative with said first swinging member, said first scale being uniformly calibrated to represent values of elevation (E) over the range from 0° to 90°, a second swinging member pivotally attached to said support adapted to be rotated by a shaft for introducing range (R) settings into the computer, said second swinging member being adapted to swing through an arc of 100°, a second scale positioned on said support in cooperative relationship with said second swinging member, said second scale being uniformly calibrated to represent values of range (R) over the range from 0 to 12,000 yards, a third swinging member pivotally attached to said support having an index point thereon, a third scale of linear configuration positioned on said support in cooperative relationship with said third swinging member, said third scale being uniformly calibrated in values of speed variation ($\Delta V$) to represent a range thereof from $-13$ to $+65$ yards per second, fourth and fifth swinging members pivotally attached to said support, first and second spur gears having a ratio of 2:1 mounted on said support in meshed relationship for rotation in a plane substantially parallel to said support, a sixth swinging member secured to said first gear for rotation therewith, a seventh swinging member secured to said second gear for rotation therewith, a first link operatively connecting the unpivoted end of said third swinging member and a first unpivoted end of said fifth swinging member, second and third links operatively connecting the second unpivoted end of said fifth swinging member and a first unpivoted point of said fourth swinging member, a fourth link operatively connecting the junction point of said second and third links and the usecured end of said sixth swinging member, a fifth link operatively connecting the unpivoted end of said second swinging member and the unsecured end of said seventh swinging member, and a sixth link operatively connecting the unpivoted end of said first swinging member and a second unpivoted point of said fourth swinging member, said links, said gears, said scales and said swinging members having the following dimensions and orientation where the basis of measurement is taken as unity (1),

| | |
|---|---|
| Length of said first swinging member | 1.000 |
| Length of said second swinging member | .7925 |
| Length of said third swinging member | .589 |
| Length of said fourth swinging member from the pivot point thereof to the said first unpivoted point thereof | .875 |
| Length of said fourth swinging member from the pivot point thereof to the said second unpivoted point thereof | 2.361 |
| Length of said fifth swinging member from the pivot point thereof to the said first unpivoted end thereof | .689 |
| Length of said fifth swinging member from the pivot point thereof to the said second unpivoted end thereof | .610 |
| Length of said sixth swinging member from the axis of rotation thereof to the unpivoted end thereof | .959 |
| Length of said seventh swinging member from the axis of rotation thereof to the unpivoted end thereof | .520 |
| Length of said first link | .8815 |
| Length of said second link | 1.223 |
| Length of said third link | 1.426 |
| Length of said fourth link | 1.184 |
| Length of said fifth link | 1.465 |
| Length of said sixth link | 1.256 |
| Distance along said third swinging member from the pivot point thereof to said index point | .580 |
| Distance along the longitudinal axis of said support from the pivot point of said third swinging member to the +65 calibration point of said third scale | 0.2 above |
| Distance along the longitudinal axis of said support from the pivot point of said third swinging member to the −13 calibration point of said third scale | .58 below |
| Angle between the longitudinal axis of said support and a line drawn along said third scale | 5.0 |
| Distance along the longitudinal axis of said support from the pivot point of said third swinging member to the pivot point of said fifth swinging member | .9715 directly below |
| Distance along the longitudinal axis of said support from the pivot point of said fifth swinging member to the pivot point of said fourth swinging member | 2.248 below |
| Angle, measured clockwise, between the longitudinal axis of said support and a line joining the pivot points of said fourth and fifth swinging members | 179.50° |
| Radial distance from the pivot point of said fifth swinging member to the pivot point of said first swinging member | 2.357 downward to left |
| Radial distance from the pivot point of said fourth swinging member to the pivot point of said first swinging member | 2.145 upward to left |

| | |
|---|---|
| Angle, measured clockwise, from a line joining the pivot points of said first and fourth swinging members and a line drawn through the pivot point of said first swinging member and the $E=0$ calibration point of said first scale | 54.1° |
| Radial distance from the pivot point of said fifth swinging member to the axis of rotation of said sixth swinging member | 1.923 downward to right |
| Radial distance from the pivot point of said fourth swinging member to the axis of rotation of said sixth swinging member | .467 upward to right |
| Distance along the longitudinal axis of said support from the pivot point of said second swinging member and the axis of rotation of said seventh swinging member | 1.000 above |
| Angle, measured clockwise, from a line joining the axis of rotation of said seventh swinging member and the pivot point of said second swinging member, and a line drawn through the pivot point of said second swinging member and the $R=0$ calibration point of said second scale | 100° | the aforementioned dimensions and orientation of said members and links providing displacement of said index of said third swinging member across said third scale in accordance with an empirical function $\Delta V = f(R, E)$ with changes in value of $R$ and $E$, as determined by the settings of said second and said first swinging members, respectively.

ANTONIN SVOBODA.

REFERENCES CITED

The following references are of record in the file of this patent:

UNITED STATES PATENTS

| Number | Name | Date |
|---|---|---|
| 2,210,938 | Garrett | Aug. 13, 1940 |
| 2,394,180 | Imm | Feb. 5, 1946 |

FOREIGN PATENTS

| Number | Country | Date |
|---|---|---|
| 113,136 | Great Britain | Feb. 7, 1918 |
| 144,893 | Switzerland | May 16, 1931 |
| 566,565 | Germany | Dec. 19, 1932 |
| 452,645 | Germany | Nov. 15, 1927 |